Oct. 12, 1965  E. R. BOLLER  3,211,884
CANNING MACHINE
Filed Feb. 21, 1946  5 Sheets-Sheet 1

Inventor
Ernest R. Boller
By
Robert A. Lavender
Attorney

Oct. 12, 1965   E. R. BOLLER   3,211,884
CANNING MACHINE
Filed Feb. 21, 1946   5 Sheets-Sheet 2

Inventor
Ernest R. Boller

By Robert A. Lavender
Attorney

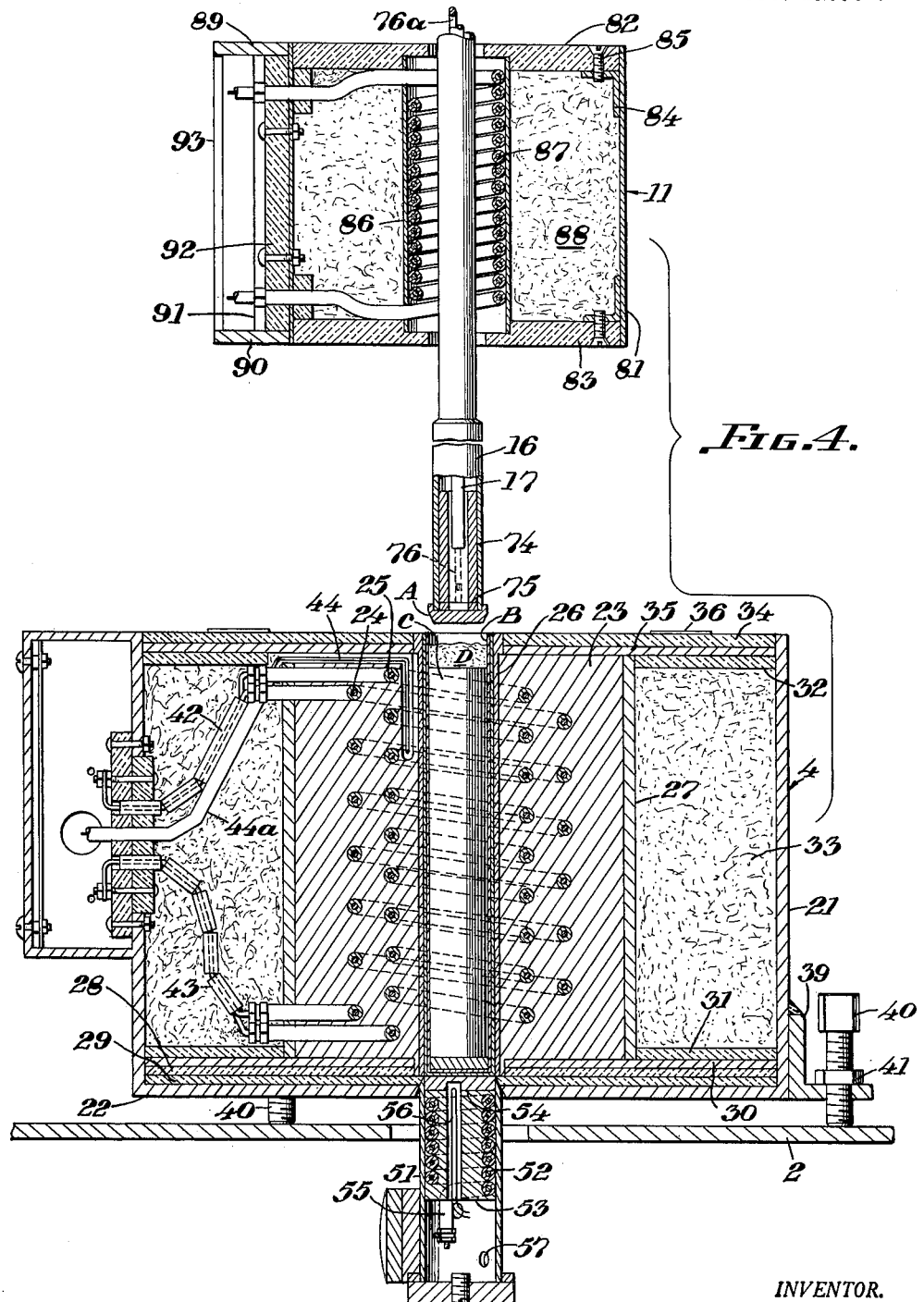

Oct. 12, 1965     E. R. BOLLER     3,211,884
CANNING MACHINE

Filed Feb. 21, 1946     5 Sheets-Sheet 5

INVENTOR.
Ernest R. Boller
BY
Robert A. Lavender

United States Patent Office 3,211,884
Patented Oct. 12, 1965

3,211,884
CANNING MACHINE
Ernest R. Boller, Marion, Ind., assignor to the United States of America as represented by the United States Atomic Energy Commission
Filed Feb. 21, 1946, Ser. No. 649,411
12 Claims. (Cl. 219—85)

This invention relates to the application of jackets or cans to rods, tubes, and the like. It is particularly concerned with a canning machine for the application of cans to metal rods or tubes in a rapid and uniform manner.

While the invention is of general application, it has been found to be particularly useful in the application of brazed or soldered metal jackets to metallic uranium rods for protecting the rods against corrosive agents and for retaining products of nuclear fission. In the application of this type of protection to uranium rods employed in atomic fission operations close tolerances must be met and uniform wall thicknesses providing effective retention of fission products and effective protection for the base metal against corrosion must encompass the uranium rod.

For accomplishing these purposes it has previously been observed that aluminum cans bonded to the uranium by a suitable solder may be employed satisfactorily. In order to secure firm bonding of the aluminum jackets or cans to the metallic uranium, it is essential that the soldering or brazing operation be carried out with the metals at elevated temperatures. These temperatures must be accurately controlled and uniform along the surface of the metal. Otherwise, inadequate bonding may occur or the bonding metal may attack the uranium base metal or the aluminum jacket to produce undesirable areas of uranium-bonding metal alloy or to penetrate the aluminum jacket by the less corrosion resistant bonding metal. One of the most effective bonding meals for bonding the aluminum jackets to uranium base metal is aluminum-silicon casting alloy, which contains between 5 percent and 20 percent of silicon and the remainder aluminum. In the application of aluminum cans bonded to base metal by such alloys, it is necessary that the bonding process be conducted at temperatures in the neighborhood of 600° C. At such temperatures the metallic aluminum is rather soft and easily deformed. Consequently it is difficult to accomplish the jacketing without injury to the jackets. This injury may take the form of local deformation or even rupture of the jacket. In either case, the injury may render the assembly unsuitable for further use.

It is an object of the present invention to provide an apparatus suitable for the jacketing of metal rods, tubes, and the like. It is a further object to provide means for holding cans during the canning operation so as to avoid deformation and injury. A further object is to provide uniform temperature control during the canning operation so as to ensure uniform bonding of cans to rods. A further object is to eject cans and rods from the supporting element without injury and in a consistently reproducible manner. A further object is to shorten the time required for canning operations. A further object is to apply caps to cans during canning operations in such a manner that the caps will be firmly bonded to the cans and rods. A further object is to provide means for maintaining the caps at an elevated temperature during application. A further object is to provide for the cooling of canned and capped rods without injury to the assembly.

A still further object of the invention is to provide a machine for accomplishing the aforementioned purposes, which is efficient in operation and easy to maintain. A further object is to provide such a machine which is operated pneumatically. A yet further object is to reduce as far as possible the manual labor involved in canning operations. Further objects of the invention will be apparent from the following detailed description thereof.

The canning machine of the invention comprises essentially a can-supporting structure having a wall-supporting element and a removable base, and a vertical plunger located above the wall-supporting element and coordinated with the removable base so as to expel the assembled units from the machine at the proper time. The can-supporting structure is provided with suitable heating means both in the wall-supporting element and the base to provide the desired operating temperatures. The heating elements are thermostatically controlled so as to maintain the temperatures rigidly within narrow limits.

The plunger also is provided with a heater for maintaining it at the proper capping temperature. While caps may be preheated to the desired operating temperature, such pre-heating would fail to accomplish the intended purpose if it were necessary to place the cap upon a relatively cool plunger. The plunger heater of the present device maintains the plunger at a temperature close to the desired cap temperature so that air-cooling of the cap is prevented when it is placed upon the plunger. The plunger is provided with suitable means for releasing the cap at the proper moment as it is seated in the can.

It will be apparent that various designs and structures may be employed for combining the essential features of the canning machine into an operative unit. Thus, the assembly may be designed for electric, hydraulic, or pneumatic operation. Numerous mechanical alternatives are available for effecting control of the various elements. The invention is described below as embodied in a pneumatic canning machine which has been found to function smoothly and satisfactorily. Other alternative mechanisms will at once occur to those skilled in the art.

The following detailed description of the preferred embodiment of the invention should be considered in connection with the accompanying drawings wherein FIGURES 1 and 2 are side and rear elevations of the machine;

FIGURE 4 is an enlarged detail, partially in section, showing the can-supporting structure, its removable base, the plunger, and the plunger heater; these units have been sectioned along the vertical axis of the machine, line A—A of FIGURE 3, to show the internal construction of the heaters and the plunger;

Figure 1:
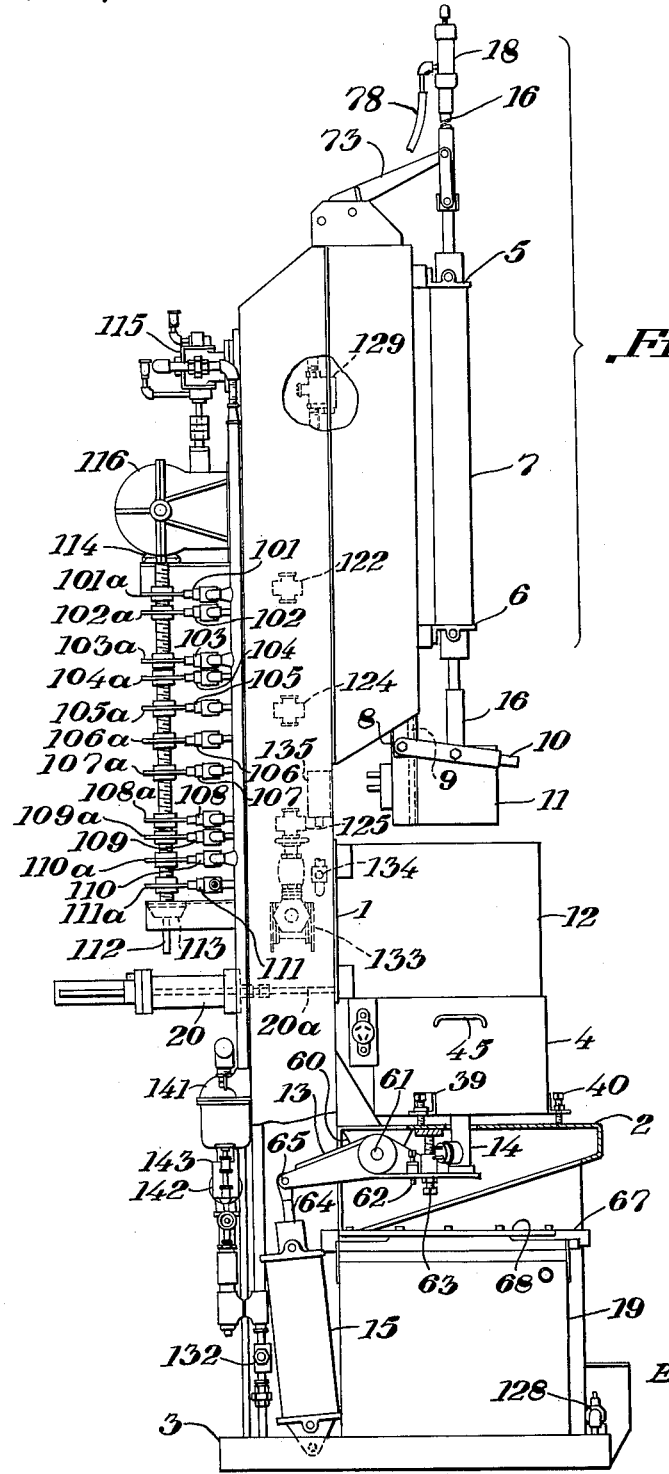
Figure 3:
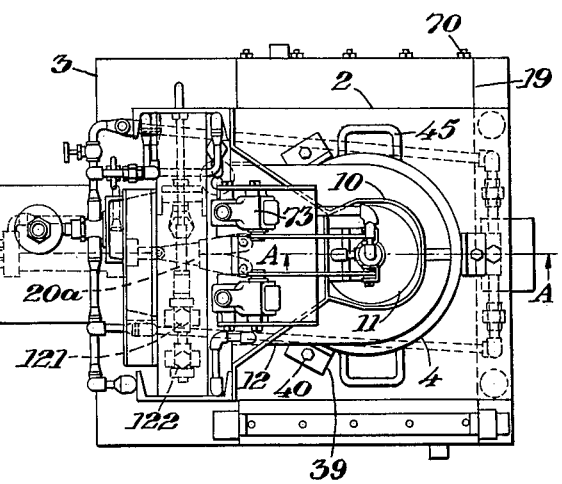
FIGURE 3 is a plan view of the machine.
Figure 2:
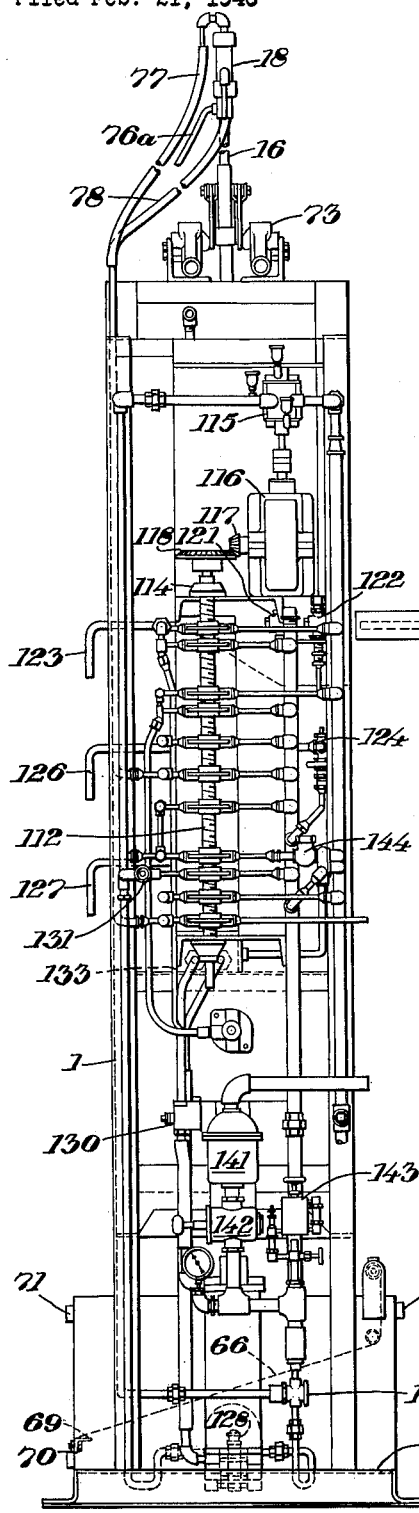

Particularly reference is made to FIGURES 1, 2, and 3 of the drawings for identification of the main features of the canning machine.

The apparatus comprises a frame 1 having a table 2 and a base 3. Resting on table 2 is a can-supporting unit 4. Fixed to frame 1 by means of brackets 5 and 6 is plunger operating cylinder 7. Suspended from frame 1 by means of bars 8, rods 9, and yoke handle 10 is a plunger heater 11. Between the can support 4 and the heater 11 is a clam-shell guard or safety shield 12. Beneath the table 2 and supported thereby on a rocker-arm 13 is a heater base 14 actuated by an air cylinder 15 pivotally mounted on the base 3. Extending through plunger operating cylinder 7 is a hollow operating plunger 16, and within plunger 16 is a second plunger 17 (see FIGURE 4). Plunger 17 is operated by a small cylinder 18 mounted at the top of plunger 16. A quench tank 19 is located directly beneath table 2 and rests on base 3. Clam-shell guard 12 is operated by air cylinder 20 through connecting links 20a.

Structural details of cam heater 4, plunger heater 11, plunger 16, and heater base 14, are best shown in FIGURE 4 of the drawing, to which reference should be made in connection with the following detailed description of these elements of the machine. FIGURE 4 shows plunger 16 descending and about to insert an aluminum cap A in an aluminum can B containing uranium rod C and excess molten metal D.

Can heater 4 comprises a cylindrical steel case 21 having an annular steel bottom 22, supporting a copper mass 23 containing cast-in heating elements 24 and 25. These heating elements and the other heating elements referred to hereinafter are of the type constructed with a helical resistance coil enclosed within a seamless metal tube, the space between the tube and coil being filled with a tightly packed material which is a good electrical insulator and heat conductor. Press-fitted into the copper mass 23 is a nickel tube 26, which constitutes the supporting wall of the can heater. The copper mass 23 is cast into a steel shell 27 and the unit of nickel tube, copper mass, and steel shell is supported upon two annular asbestos-cement composition discs 28 and 29 which rest on the bottom 22. The copper mass is separated from the uppermost disc 28 by three sheets 30 of asbestos. The steel shell 27 is centered in the case 21 by annular asbestos-cement composition discs 31 and 32 at the bottom and top. The space between these discs is filled with insulation 33, e.g., vermiculite. The heater is provided with annular asbestos-cement composition cover 34, which is separated from the copper mass 23 by asbestos sheets 35 and is held in place by angular metal cleats 36. The bottom disc 29, and the base 22 are beveled around the central opening so that the base element 14, which has a mating bevel, may be seated firmly to provide a platform for the can or sleeve employed in the canning operation. Welded to the steel case 21 are three steel angles 39 for supporting the heater. These angles are threaded for supporting bolts 40 provided with lock-nuts 41. The bolts 40 permit accurate alignment of can-supporting tube 26 with heater base 14 and plunger 16. The heating elements 24 and 25 are connected in parallel and by means of lead wires 42 and 43 are connected to a suitable current source. A thermocouple 44 with leads 44a is provided close to the supporting tube 26 to actuate thermostatic control of current to the heating elements 24 and 25 and thus to maintain precisely the required temperature.

Two handles 45 (FIGURES 1 and 3) are provided on opposite sides of case 21 for lifting and moving the heater.

In constructing heater 4 the heating elements may be formed into the appropriate shape within the steel shell 27 or wrapped around a copper billet therein and molten copper then may be poured into the shell. The pouring should be done carefully and cooling should be effected promptly so as to minimize injury to the stainless steel cases of the heating units. After the casting is completed, the center is drilled to permit introduction of the tube 26. When a copper billet is not employed, it is expedient to drill a substantially larger hole through the casting and to re-cast the center at a higher casting temperature in order to provide greater density of the casting in the vicinity of the tube; the re-cast center is then bored or milled and the tube is sweated into it.

The removable base unit 14 comprises a steel case 51 (FIGURE 4) containing a heating element 52 embedded in a copper mass 53. A stainless (18–8) steel plug 54 located at the top of unit 14 serves as a base for the can or can-supporting sleeve. The heating element 52 is connected to a suitable current source by lead-wires 55. A thermocouple 56 is provided in the copper mass 53 for controlling thermostatically the flow of current to element 52 and maintaining the precise temperature desired. Two or more vent holes 57 are provided in case 51 to prevent the lower portion of the unit 14 from overheating.

Rocker arm 13, to which base unit 14 is fixed, is pivotally suspended from table 2 by means of a pair of lugs 60 and bearing pin 61. The terminal positions of rocker arm 13 are controlled by set-screws 62 and 63. Pneumatic cylinder 15 actuates the rocker arm by means of piston rod 64 and link pin 65, effectively pivoting base unit 14 to a completely non-supporting position, thus permitting a canned article to be ejected from heater 4 into tank 19.

Quench tank 19 is provided with a sloping web sheet 66 for breaking the fall of metal pieces and causing them to roll to one side of the apparatus where they may be removed readily. At its upper end the web is clamped between a tube 67 and a conforming clamping member 68. At its lower end it is clamped between the side of the tank and an angle iron bar 69 held by bolts 70. Water inlet 71 and outlet 72 are provided at opposite ends of the tank for passing cooling water through the tank.

Instead of depending upon the slope of web 66 to bring the canned article to the side of the tank, it is sometimes preferable to retain the article in a vertical position by means of a steel ring (not shown) supported by the sides of the tank in axial alignment with tube 26. The ring may be wrapped with asbestos or glass fibre. For large articles which do not become chilled below the melting point of the bonding metal immediately, this arrangement avoids the possibility of a sharp lateral jar, which might shake some of the metal from the braze line of the cap. Smaller articles have less heat capacity and consequently cool more quickly so that such measures are unnecessary.

The plunger 16 is arranged for vertical reciprocation between a high position with its lower end in heater 11 and a low position with its lower end approximately flush with the bottom of heater 4. Near its terminal positions the motion of plunger 16 is controlled in part by double-action shock absorbers 73. Within plunger 16 at its lower end is an annular copper plug 74 and a stainless (18–8) steel base plate or ring 75. The plug 74 is provided with a thermocouple 76 for thermostatic control of heater 11. Thermocouple lead wires 76a pass up through plunger 16 and out just below cylinder 18.

Cylinder 18, which actuates the inner plunger 17, is operated by air pressure supplied by flexible hose 77, which is also, on occasion, a vacuum connection such that suction may be maintained to assist in holding a cap on plunger 16 in the manner shown in FIGURE 4. The cylinder 18 contains a compression spring (not shown) which maintains its piston normally in the uppermost position. The piston is sealed by a conventional loose-fitting pliable cup with its free edge up. Application of pressure by way of hose 77 causes the piston in cylinder 18 to move downward against the resistance of the spring. Release of pressure permits the piston to return. Hose 78 provides an air pressure connection to the interior of plunger 16 (below the low position of the piston in cylinder 18) so that air can be admitted to blast out any molten metal which may tend to clog the plunger.

Plunger heater 11 (See FIGURE 4) comprises a cylindrical metal case 81 having asbestos-cement composition top and bottom members 82 and 83 fastened to it by tapped iron angles 84 and countersunk screws 85. Clamped between members 82 and 83 is a metal cylinder 86 containing a heating element 87. The case 81 is filled with insulating material 88, such as vermiculite. Case 81 is provided with a pair of horizontal lugs 89 and 90 supporting a pair of bushings or guideways 91 which slide up and down vertical rods 9 fixed to the frame of the machine and thus maintain the plunger heater in proper alignment with the plunger. By means of the operating handle 10 which supports heater 11 loosely at two points defining a line approximately over its center of gravity, the heater may be elevated a few inches to permit placement of a cap on the end of the plunger and also to permit ready access to the end of the plunger for cleaning while it is in its high position. The ends of heating element 87 pass through holes near the top and bottom of case 81 and are held in position by the asbestos-cement composition block 92. The terminals are connected to a current source by conventional electrical connectors. Added rigidity for the guideways 91 and protection for the heater terminal are provided by angles 93 connecting lugs 89 and 90 and welded to the lugs and to the case 81.

The general sequence of operations of the parts of the canning machine so far described is as follows:

First, suction is applied and maintained at the end of plunger 16 to hold a cap A. Second, the clam-shell shield 12 closes and plunger 16 descends toward heater 4 at a controlled pressure, full pressure at first, then light pressure as it approaches the seating position for cap A in the top of can B and then with full pressure again to firmly seat the cap. At about the same time suction is shut off because it is no longer necessary nor desirable, for retaining the cap on the plunger. Pressure on the plunger is now released while air cylinder 15 shifts base 14 to its low position so that it will not interfere with passage of the canned article from heater 4 and plunger 17 within plunger 16 is actuated so that it will continue to press cap A into can B as the latter leaves heater 4.

Full pressure is now applied to plunger 16 to eject the canned article. When plunger 16 reaches its low position, it is blasted with air supplied by hose 78 to expel any molten metal adhering to the inner surfaces. Plungers 16 and 17 and base 14 are then returned to their initial positions and suction on plunger 16 is resumed.

The pneumatic control system for operating the canning machine to provide the desired sequence of operations comprises valves 101 to 111 and actuating cams 101a to 111a. Valves 101 to 111 are opened and closed by push rods actuated by the corresponding cams 101a to 111a. Cams 101a to 111a are mounted on shaft 112 journaled in bearings 113 and 114 fixed to the main frame. The shaft is driven by air motor 115 through a speed reducing gear train 116 and a pair of bevel gears 117 and 118.

The canning machine is adapted primarily for semi-automatic operation. However, manual movement of the plunger 16, base 14, and clam-shell 12 is effected by means of valves 121 and 122 operated by handle 123 and valves 124 and 125 operated by handles 126 and 127. Semi-automatic operation is controlled by the pedal valve 128 admitting air to air motor 115.

For facilitating smooth and efficient operation of the machine, regulating valves 129 and 130 having ball check by-passes for reverse flow are provided for adjusting the rate of air flow to the upper ends of cylinders 7 and 15, respectively, and needle valve 131 is provided for adjusting the speed of air motor 115. The air conduit from pedal valve 128 by-passes needle valve 131 in order to insure ample air pressure on the air motor in starting. However, this extra air flow is unnecessary during the cycle and would tend to relate the speed of the air motor to the foot pressure of the operator; consequently air-actuated air cut-off valve 132 is provided for cutting off the flow of air to pedal valve 128 as soon as the cycle starts. Air-actuated four-way valve 133 is provided for controlling the operation of cylinder 15. This valve is so arranged that whichever end of cylinder 15 is not open to air pressure is open to exhaust. A relief valve 134 is provided to maintain a carefully adjusted pressure on plunger 16 during that portion of the operating cycle in which seating of the cap A takes place. Pressure gauge 135 provides a check on the operation of this relief valve. Air filter 141 is provided on the main supply line to clean all inlet air and between the filter and the machine proper are a reducing valve 142 and an oiler 143, which introduces a small amount of oil into the air stream to lubricate valves and cylinders. Between valve 108 and the exhaust line a check valve 144 is provided to prevent backflow of air through valve 108 and into the suction line via valve 111.

The precise arrangement of piping employed is of no particular consequence. It should be noted, however, that the conduits leading to cylinder 18 and cylinder 15 should be flexible in order to permit the movement of these two members. In the case of cylinder 15 the movement is only a slight rocking motion, but in the case of cylinder 18 the motion is equal to the stroke of plunger 16.

For a full analysis of an operating cycle reference should be made to FIGURES 5 to 17 showing the conduit system and cam design. In considering the cam design, two circumstances should be kept in mind; first, the cams do not control directly the mechanical movements of the machine but exert their effects through an intermediate compressible fluid medium; second, the cam design is necessarily influenced by the shape of the cam follower and by the characteristics of the valve it controls. Thus depression of the valve stem halfway from fully closed to fully open may not correspond to a half-open condition. From consideration of the cam contours shown in FIGURES 7 to 17 it will be apparent that this factor normally affects only the rates of valve opening and closing since is most cases the valves are moved from fully closed to fully open position and back again.

The operation of the several elements and their coordination can best be understood by following the events of a representative cycle. In FIGURES 7 to 17 the cam contours have been arranged to show their relative positions at any moment during a cycle. More specifically, all of the cams are shown with 12 o'clock representing the zero or standby position of the shaft. It will be observed that at this point in the cycle valves 101, 104, 105, 108, and 111 are open and that valves 102, 103, 106, 107, 109, and 110 are closed. Thus, plunger 16 is held in its high position by cylinder 7 whose top is open to exhaust and whose lower end is open to air pressure; base 14 is held in position by cylinder 15 whose upper end is open to air pressure and whose lower end is open to exhaust; and suction is applied to plunger 16 by open valve 111. The leather cup piston seal in the cylinder 18 acts as a one-way valve to permit flow of air up through this cylinder. Check valve 144 prevents flow of gas from valve 108 to valve 111 during this period.

Figure 5:
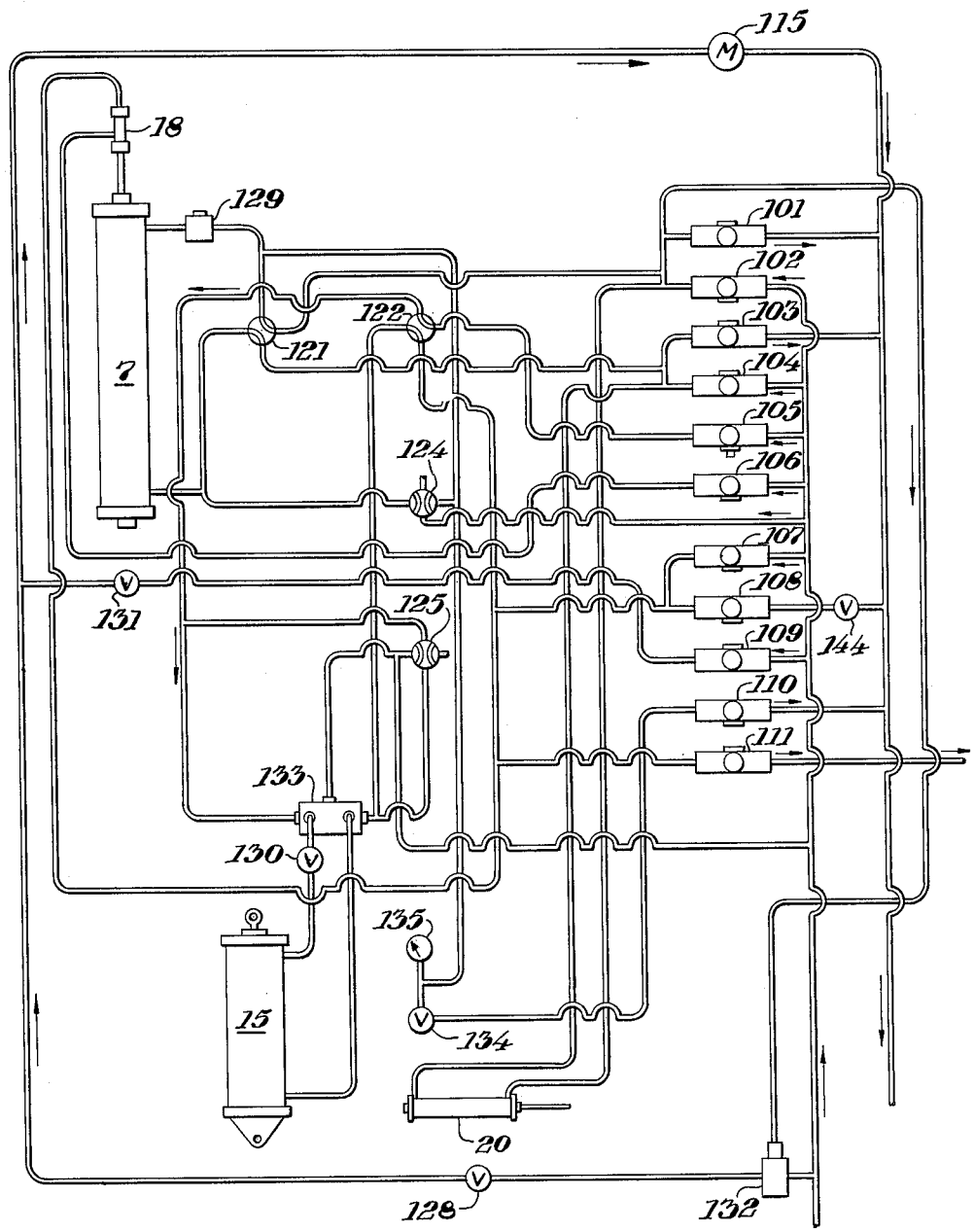
FIGURE 5 is a schematic diagram of the piping showing the pneumatic control system which operates the machine.
Figure 7:
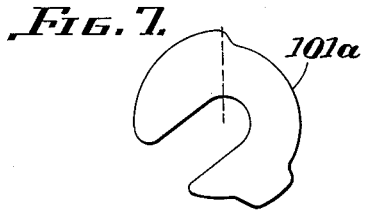
FIGURES 6 to 17 show the cam shaft and the contours of the cams which control the air valves to coordinate the various operations of the machine; the reference numerals in FIGURE 6 designate the figures in which the respective cam contours are shown.
Figure 8:
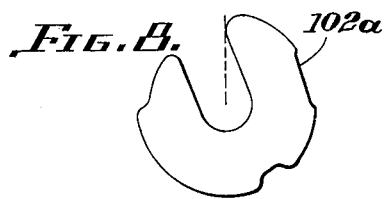
Figure 9:
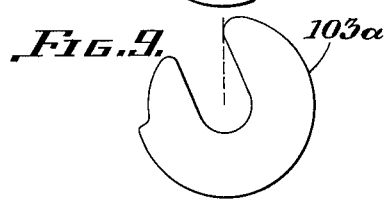
Figure 10:
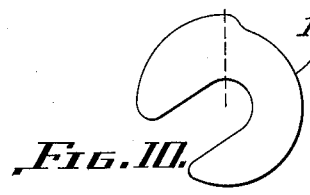
Figure 11:
Figure 12:
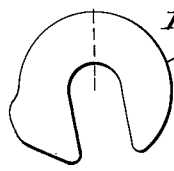
Figure 6:
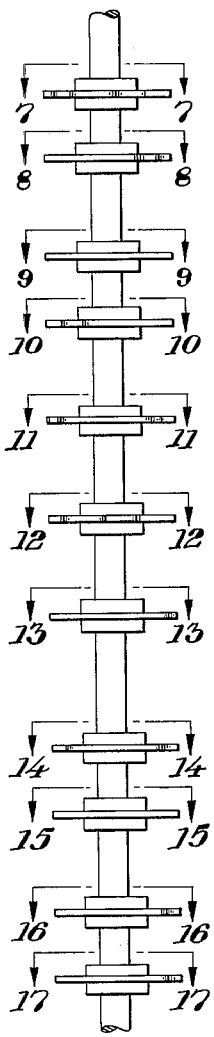
Figure 13:
Figure 14:
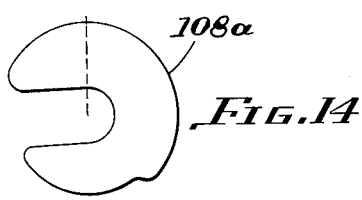
Figure 15:
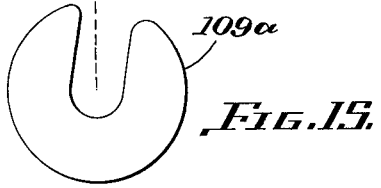
Figure 16:
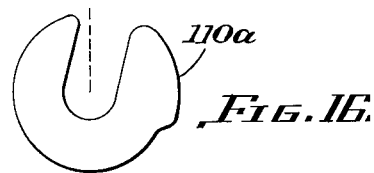
Figure 17:
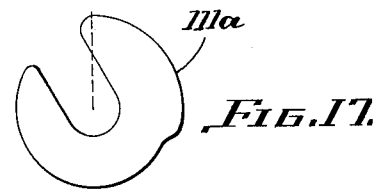

To start a cycle on semi-automatic operation, valves 121 and 122 should be open to the positions shown in FIGURE 5 and valves 124 and 125 should be closed. Pedal valve 128 is depressed to actuate air motor 115, which rotates shaft 112 so that cams 101a to 111a rotate in a counter-clockwise direction. The first four cycle events—the actuation of valves 101 to 104 by their corresponding cams to change their positions, thus starting plunger 16 downward and closing clam-shell 12—occur during the first 15 degrees of rotation, essentially simultaneously, and may be regarded as one event.

Cam 109a controls admission of air to the air motor 115. At about 40 degrees this cam transfers control of the air motor from foot pedal 128 to automatic operation until completion of the cycle. To accomplish this purpose it cooperates with valve 132. From an examination of the cam contour it is apparent that valve 109 remains open for about ⅞ of the cycle. Valve 132 is air actuated to close as soon as pressure is applied to the upper end of cylinder 7. Thus, when the operator's foot is removed from the pedal operated valve 128, the air supply is continued through valve 109 to maintain the operation of air motor 115. At the same time, further air supply to valve 128 is prevented by valve 132.

The next cycle event occurs at about 45 degrees of rotation. At this point valve 110 is opened reducing the pressure in the upper end of cylinder 7 to the relief valve pressure, approximately 10 pounds. This reduction in actuating pressure coupled with the resistance of exhaust air passage through the exhaust valve 101 checks the speed of plunger 16 as its end approaches the seating position for the cap A. Coincidentally valve 102 is actuated to avoid excessive escape of air.

At approximately 105 degrees of rotation valve 110 is closed and valve 102 is opened fully, causing pressure to build up again in the upper end of cylinder 7.

The next cycle event is effected by cam 111a which closes the suction valve 111 after approximately 110 degrees of rotation of the cam shaft. By discontinuing suction before the cap is seated, the drawing of molten metal into the plunger is avoided.

The next cycle event is a quintuple affair, valves 101 and 107 opening and valves 102, 105, and 108 closing in the 120–150 degree period. The actuation of valves 101 and 102 releases the pressure on plunger 16 and avoids pressing the canned article against base 14 while this base is being lowered by cylinder 15. The time required for the movement of base 14 occupies only a small fraction of the cycle, not more than 10 or 15 degrees. Valve 105 is a three-way valve with a side port which opens the low pressure side to the atmosphere when the valve is closed.

At about 170 degrees valve 101 is closed and valve 102 is opened fully to eject the canned article from heater 4 into tank 19.

The next cycle event is the opening of valve 106 at about 260 degrees. This causes air to flow through the plunger and expel any molten metal while the plunger is at substantially its lowest position. At approximately 270 degrees of rotation cams 101a and 104a open the corresponding valves, and cams 102a and 103a close the corresponding valves. These operations return plunger 16 to the top of the machine. As soon as the exhaust valve 101 opens, valve 132 also opens so that it will not interfere with introduction of air to valve 128 on the next cycle. From about 290 degrees to 320 degrees cams 105a, 107a, and 108a, actuate the corresponding valves to return base 14 to its closed position and at about 355 degrees cam 111a opens the vacuum valve to apply suction to plunger 16. When valve 109 reaches closed position, about 355 degrees, admission of air to the air motor 115 ceases and the cycle stops until the pedal of valve 128 is depressed to start a succeeding cycle.

The cap-removing plunger 17 is actuated by valve 107. Since valve 107 is opened at about 130 degrees of the cycle and closed at about 315 degrees, plunger 17 is under pressure sufficient to remove a cap from the end of plunger 16 during this portion of the cycle.

Employing an air pressure of about 150 pounds per square inch on the main air supply line, an apparatus having cams designed as described completes a normal operating cycle in about 12 to 15 seconds.

In a canning machine for jacketing 8-inch slugs stroke of plunger 16 was approximately 28 inches. This stroke may be varied to suit the desired head room over the heater 4.

In application of the apparatus to the coating of metallic uranium rods by means of aluminum jackets it is preferred to effect the canning operation using a steel supporting sleeve. The steel sleeve is designed to fit readily into the tube of heater 4 when the latter is hot and is ejected along with the jacketed rod, thus providing support for the jacket while it is passing from the heater to the quench tank.

The following specific example further illustrates the use of the canning machine described, for the application of aluminum jackets to uranium rods.

*Example:*

Metallic uranium rods to be jacketed were approximately 8 inches long and 1.36 inches in diameter. The nickel tube of heater 4 was approximately 9⅞ inches tall and 1.52 inches in diameter. The aluminum can had an inside diameter of 1.375 inches and a wall thickness of approximately 35 mils. An aluminum disc about ¼ inch thick and 1.32 inches in diameter was employed as protection for the uranium rod at the bottom of the can and a cap about 5/16 inch thick and 1.365 inches in diameter and tapering slightly for about half its length to 1.350 inches in diameter was employed to protect the top of the uranium rod and seal the open end of the can. The central portion of the upper face of the cap was machined out to provide a circumferential ridge having an internal diameter corresponding to the diameter of plunger 16 for centering the cap accurately on the plunger. A mild steel cylindrical container approximately 9½ inches long and 1.45 inches in inside diameter (cold) sliding easily into the hot nickel tube was employed as a support for the aluminum can.

The metallic uranium rods were prepared for coating by immersing each rod in aqueous about 60% nitric acid solution at a temperature of about 55° C. for about 5 minutes, rinsing in clean warm water, and drying.

Each rod was immediately dipped through a ½-inch depth of flux of the composition 53% potassium chloride, 42% lithium chloride, and 5% sodium chloride, by weight, into a molten bronze bath consisting of 53 parts of tin and 47 parts of copper by weight, at a temperature of about 720° C. for about 45 seconds.

Upon removal from the bronze bath each rod, which was uniformly coated with a bronze coating, was immersed in a bath of molten tin at 640° C. for 20 seconds. The rod was removed from the tin bath, centrifuged at 640 r.p.m. in a centrifuge supporting the rod at about 6 inches from the axis of rotation for five seconds to remove excess tin, and then immersed in a bath of 0.1% sodium-modified, degassed 13X aluminum-silicon alloy (Federal Specification AN–QQ–A–366, Amendment 4 A1–13X), at 600° C. for 6 seconds.

During these coating operations the canning machine was maintained in stand-by condition at cycle zero with the thermostats to the heaters adjusted to provide a temperature in heater 4 of about 590° C. and base and plunger temperatures of approximately 640° C., and a steel sleeve coated internally and externally with "Aquadag" was inserted in the nickel tube 26 of heater 4.

Meanwhile an aluminum can was cleaned by rinsing first with trichlorethene, then with aqueous 0.1% soap solution containing 0.1% sodium pyrophosphate at 80° C. and finally with aqueous 20% ortho-phosphoric acid solution for 5 minutes at 20° C.

The freshly cleaned can was dropped into the steel container in the nickel tube 26 in heater 4 approximately one minute before the uranium rod was ready for insertion. Eighty grams of 13X aluminum-silicon alloy at a temperature between 600° C. and 640° C. and the aluminum protective disc, previously preheated 2½ minutes in nitrogen to about 600° C., were added to the aluminum can promptly and the top cap was affixed to the end of plunger 16 and held in place by the suction maintained.

The uranium rod was passed from the aluminum-silicon alloy bath directly into the can and the foot pedal 128 operating the air motor 115 was depressed causing clam-shell 12 to close and plunger 16 to descend and fix the cap in the can, and after deflection of base 14, to continue its descent, causing the canned rod to be expelled from the lower end of tube 26 into the quench tank 19. The plungers 16 and 17 and removable base 14 then returned to their normal high positions, the clamshell opened, and the machine came to a stop at the cycle zero position ready for a repetition of the operating cycle.

During the early descent of the plunger, suction through the end of plunger 16 assisted in maintaining the cap on the plunger. The termination of this suction as the cap approached seating position prevented molten metal from being sucked in. When the plunger reached the bottom of its stroke, the opening of valve 106 caused air at high velocity to blow molten metal from the end of the plunger. The automatic closing of the clam-shell shield during the descent of the plunger prevented any molten metal from splashing onto the operator.

Upon return of the machine to its normal stand-by position, it is possible for the operator to remove any molten metal that might interfere with the next cycle. The end of plunger 16 also may be exposed for cleaning, merely by raising the plunger heater 11 slightly.

It will be understood that I intend to include variations and modifications of the invention and that the preceding example is illustrative only and in no wise to be construed as a limitation upon the invention, the scope of which is defined in the appended claims, wherein

I claim:

1. A canning machine comprising a can-supporting structure having a wall-supporting element and a base movable between a supporting position and a non-supporting position, a vertical plunger located above said wall-supporting element and adapted to move between a high position free of said wall-supporting element and a low position within said wall-supporting element, plunger actuating means and base actuating means whereby said base may be moved from said supporting position to said non-supporting position as the plunger is enroute from its high position to its low position.

2. The machine of claim 1 in which said wall-supporting element and said plunger are provided with means for maintaining their working surfaces at controlled elevated temperatures.

3. The machine of claim 1 in which said plunger is provided with cap holding and releasing means synchronized with the plunger actuating means to hold a cap when said plunger is in said high position and release it at a predetermined point between said high and low positions.

4. A canning machine comprising a can-supporting structure having a wall-supporting element and a base movable between a supporting position and a non-supporting position, a vertical plunger located above said wall-supporting element and adapted to move between a high position free of said wall-supporting element and a low position within said wall-supporting element, plunger actuating means and base actuating means, and means for synchronizing said plunger and said base actuating means whereby said base is moved from said supporting position to said non-supporting position as the plunger is enroute from its high position to its low position.

5. The machine of claim 4 in which said plunger is provided with cap holding and releasing means synchronized with the plunger actuating means to hold a cap when said plunger is in said high position and release it at a predetermined point between said high and low positions, and means for maintaining the working surfaces of said wall-supporting element, said base, and said plunger at controlled elevated temperatures.

6. The machine of claim 4 in which said plunger is provided with cap holding and releasing means synchronized with the plunger actuating means to hold a cap when said plunger is in said high position and release it at a predetermined point between said high and low positions, means for maintaining the working surfaces of said wall-supporting element, said base, and said plunger at controlled elevated temperatures, said temperature control means including thermostatically controlled heaters in said wall-supporting element and base and a thermostatically controlled heater surrounding the plunger in its high position.

7. The canning machine of claim 1 wherein said plunger actuating means and base actuating means comprise pneumatic cylinders controlled by valves actuated by an air-motor-driven coordinating means.

8. The canning machine of claim 1 in which said plunger is provided with cap holding and releasing means synchronized with the plunger actuating means to hold a cap when said plunger is in said high position and release it at a predetermined point between said high and low positions, said plunger actuating means and base actuating means and said cap holding and releasing means being pneumatically controlled by valves operated by a series of cams on a single shaft rotated by an air motor.

9. The machine of claim 4 in which said plunger is provided with cap holding and releasing means synchronized with the plunger actuating means to hold a cap when said plunger is in said high position and release it at a predetermined point between said high and low positions, means for maintaining the working surfaces of said wall-supporting element, said base, and said plunger at controlled elevated temperatures, said temperature control means including thermostatically controlled heaters in said wall-supporting element and base and a thermostatically controlled heater surrounding the plunger in its high position, said cap holding and releasing means comprising means for applying suction, said plunger actuating means and said base actuating means comprising pneumatic cylinders, said suction means and said cylinders being controlled by cam-operated valves and an air motor for the synchronous rotation of said cams.

10. The machine of claim 4 in which said plunger is provided with cap holding and releasing means comprising suction means synchronized with the plunger actuating means to hold a cap on the end of said plunger when said plunger is in said high position and release it at a predetermined point between said high and low positions, means for maintaining the working surfaces of said wall-supporting element, said base and said plunger at controlled elevated temperatures, said temperature control means including thermostatically controlled heaters in said wall-supporting element and base and a thermostatically controlled heater surrounding the plunger in its high position, the temperature-sensitive elements of said thermostats being embedded in said wall-supporting element, said base and said plunger, respectively.

11. The machine of claim 4 in which said plunger is provided with cap holding and releasing means comprising suction means synchronized with the plunger actuating means to hold a cap on the end of said plunger when said plunger is in said high position and release it at a predetermined point between said high and low positions, means for maintaining the working surfaces of said wall-supporting element, said base, and said plunger at controlled elevated temperatures, said temperature control means including thermostatically controlled heaters in said wall-supporting element and base and a thermostatically controlled heater surrounding the plunger in its high position, the temperature-sensitive elements of said thermostats being embedded in said wall-supporting element, said base and said plunger, respectively, said cap releasing means, said plunger actuating means and said base actuating means comprising pneumatic cylinders, said suction means and said cylinders being controlled by cam-operated valves and an air motor for the synchronous rotation of said cams.

12. The machine of claim 4 in which means are provided for checking said plunger actuating means during the operation of said base actuating means whereby the base actuation occurs in the absence of substantial pressure from said plunger.

(References on following page)

References Cited by the Examiner

UNITED STATES PATENTS

| | | | |
|---|---|---|---|
| 779,526 | 1/05 | Cerruti. | |
| 877,843 | 1/08 | Hoskin | 219—530 |
| 1,064,739 | 6/13 | Johnson | 219—221 |
| 1,464,255 | 8/23 | Zimmerman | 219—436 X |
| 1,621,580 | 3/27 | Cameron | 113—14 |
| 1,924,409 | 8/33 | Manson | 219—521 |
| 2,104,224 | 1/38 | Fisher | 113—30 |
| 2,255,707 | 9/41 | Kronquest | 113—23 X |

FOREIGN PATENTS 24,933  1911  Great Britain.

RICHARD M. WOOD, *Primary Examiner.*

ROBERT L. GLASS, JAMES L. BREWRINK,
*Examiners.*